(12) United States Patent
Sartipi

(10) Patent No.: US 11,797,953 B2
(45) Date of Patent: Oct. 24, 2023

(54) ELECTRONIC PAYMENT SYSTEM INCLUDING MERCHANT SERVER AND ASSOCIATED METHODS

(75) Inventor: Siamak Sartipi, Waterloo (CA)

(73) Assignee: MALIKIE INNOVATIONS LIMITED, Dun Laoghaire (IE)

( * ) Notice: Subject to any disclaimer, the term of this patent is extended or adjusted under 35 U.S.C. 154(b) by 1719 days.

(21) Appl. No.: 12/572,751

(22) Filed: Oct. 2, 2009

(65) Prior Publication Data

US 2010/0131415 A1 May 27, 2010

Related U.S. Application Data

(60) Provisional application No. 61/117,516, filed on Nov. 24, 2008.

(51) Int. Cl.
*G06Q 20/02* (2012.01)
*G06Q 20/20* (2012.01)
(Continued)

(52) U.S. Cl.
CPC ........... *G06Q 20/02* (2013.01); *G06Q 20/204* (2013.01); *G06Q 20/325* (2013.01);
(Continued)

(58) Field of Classification Search
CPC .................................................. G06Q 20/227
(Continued)

(56) References Cited

U.S. PATENT DOCUMENTS 5,870,723 A * 2/1999 Pare et al. ...................... 705/39
7,273,168 B2 9/2007 Linlor ........................... 235/380
(Continued)

FOREIGN PATENT DOCUMENTS

| CA | 2686259 | 5/2010 | |
|----|---------|--------|------|
| WO | 02/50788 | 6/2002 | ............. G07F 19/00 |

(Continued)

OTHER PUBLICATIONS

Examiner's Report dated Jun. 20, 2012 from CA 2,686,248, 5 pgs.
(Continued)

*Primary Examiner* — Jay Huang
(74) *Attorney, Agent, or Firm* — Jenna L. Wilson; Wilson Lue LLP

(57) ABSTRACT

An electronic payment system is for a merchant server to transfer funds from a purchaser account to a merchant account, the merchant server to send a merchant transaction identification (ID) and transaction information. The electronic payment system includes a mobile wireless communications device to send a purchaser transaction ID and purchaser account access information. A payment processor server is to receive the purchaser transaction ID and purchaser account access information, and is also to send the transaction information to the mobile wireless communications device if the merchant transaction ID matches the purchaser transaction ID. The mobile wireless communications device is also to send confirmation of the transaction information to the payment processor server. The payment processor server is also to effect a transfer of funds from the purchaser account to the merchant account based upon the confirmation of the transaction information and the purchaser account access information.

15 Claims, 11 Drawing Sheets

(51) Int. Cl.
  *G06Q 20/32* (2012.01)
  *G06Q 20/40* (2012.01)
  *G06Q 30/0226* (2023.01)

(52) U.S. Cl.
  CPC .......... *G06Q 20/326* (2020.05); *G06Q 20/40* (2013.01); *G06Q 20/401* (2013.01); *G06Q 30/0233* (2013.01)

(58) Field of Classification Search
  USPC ....................................... 705/64, 16, 17, 39
  See application file for complete search history.

(56) References Cited

U.S. PATENT DOCUMENTS

| | | | |
|---|---|---|---|
| 7,353,991 B2 | 4/2008 | Esplin et al. | 235/383 |
| 7,364,071 B2 | 4/2008 | Esplin et al. | 235/383 |
| 7,434,723 B1 | 10/2008 | White et al. | 235/375 |
| 7,506,804 B2 * | 3/2009 | Zajkowski | G07F 7/1008 235/375 |
| 7,584,151 B2 * | 9/2009 | Wells et al. | 705/64 |
| 7,729,984 B1 * | 6/2010 | Nappi | 705/39 |
| 7,783,532 B2 * | 8/2010 | Hsu | G06Q 30/0236 705/28 |
| 9,830,582 B1 * | 11/2017 | Barrett | G06Q 20/20 |
| 2002/0007330 A1 * | 1/2002 | Kumar et al. | 705/36 |
| 2002/0099663 A1 * | 7/2002 | Yoshino | H04L 63/0807 705/65 |
| 2003/0204725 A1 | 10/2003 | Itoi et al. | |
| 2004/0049454 A1 * | 3/2004 | Kanno | G06Q 20/06 455/406 |
| 2004/0098350 A1 * | 5/2004 | Labrou et al. | 705/64 |
| 2004/0107170 A1 * | 6/2004 | Labrou et al. | 705/64 |
| 2006/0064380 A1 * | 3/2006 | Zukerman | 705/44 |
| 2006/0208065 A1 * | 9/2006 | Mendelovich | G06Q 20/227 705/14.27 |
| 2007/0022058 A1 * | 1/2007 | Labrou | G06Q 20/322 705/67 |
| 2007/0255652 A1 | 11/2007 | Tumminaro et al. | 705/39 |
| 2008/0010191 A1 | 1/2008 | Rackley, III et al. | 705/39 |
| 2008/0099552 A1 | 5/2008 | Grillion | 235/380 |
| 2008/0120129 A1 * | 5/2008 | Seubert et al. | 705/1 |
| 2008/0121696 A1 | 5/2008 | Mock et al. | 235/380 |
| 2008/0126145 A1 | 5/2008 | Rackley, III et al. | 705/7 |
| 2008/0166998 A1 | 7/2008 | Sun et al. | 455/406 |
| 2008/0208681 A1 | 8/2008 | Hammad et al. | 705/13 |
| 2008/0208744 A1 | 8/2008 | Arthur et al. | 705/41 |
| 2008/0235105 A1 | 9/2008 | Payne et al. | 705/26 |
| 2008/0257952 A1 | 10/2008 | Zandonadi | 235/379 |
| 2008/0270246 A1 * | 10/2008 | Chen | 705/17 |
| 2008/0301041 A1 * | 12/2008 | Bruk | G06Q 20/357 705/39 |
| 2009/0037286 A1 * | 2/2009 | Foster | G06Q 20/20 705/16 |
| 2009/0039150 A1 * | 2/2009 | Lay | G06Q 20/341 235/379 |
| 2009/0327133 A1 * | 12/2009 | Aharoni et al. | 705/44 |
| 2010/0036770 A1 * | 2/2010 | Fourez | G06Q 20/40 705/41 |
| 2010/0131415 A1 * | 5/2010 | Sartipi | G06Q 20/401 705/75 |

FOREIGN PATENT DOCUMENTS

| | | | |
|---|---|---|---|
| WO | 03/038719 | 5/2003 | G06F 17/60 |
| WO | 02/29739 | 4/2005 | G07F 7/00 |

OTHER PUBLICATIONS

Examiner's Report dated Mar. 5, 2014 from CA 2,686,248, 4 pgs.
Extended European Search Report dated Dec. 23, 2009 from EP 09172136.5, 6 pgs.
Examiner's Report dated Nov. 17, 2014 from from EP 09172136.5, 5 pgs.
Examiner's Report dated Apr. 4, 2017 from from EP 09172136.5, 5 pgs.
Summons to attend Oral Proceedings dated Jun. 18, 2019 from EP 09172136.5, 7 pgs.
Summons to Oral Proceedings dated Sep. 20, 2021 from EP 09172136.5, 14 pgs.

* cited by examiner

ELECTRONIC PAYMENT SYSTEM INCLUDING MERCHANT SERVER AND ASSOCIATED METHODS

RELATED APPLICATIONS

This application is based upon prior filed copending provisional application Ser. No. 61/117,516 filed Nov. 24, 2008, the entire subject matter of which is incorporated herein by reference in its entirety.

TECHNICAL FIELD

The present disclosure relates to the field of electronic payment systems and, more particularly, to the use of a mobile wireless communications device to facilitate an electronic payment at a point-of-sale.

BACKGROUND

Consumers in mobile societies may carry a variety of personal possessions, such as keys, wallets, credit cards, loyalty cards, gift cards, coupons, money clips, and electronic devices. In particular, many consumers carry a mobile wireless communications device, such as a cellular telephone. One way to reduce this clutter of personal possessions is to reduce the number of items typically carried in a wallet, or to eliminate the wallet altogether.

Since many mobile wireless communications devices also function as PDA's (Personal Digital Assistants) and have connectivity with the Internet, it may be desirable to facilitate payment for goods and services with a consumer's mobile wireless communications device rather than with cash, checks, or credit/debit cards.

Accordingly, a desire exists for an electronic payment system that may not require a hardware upgrade of existing point of sale devices, safeguards a user's privacy, and allows easy modification of purchase amounts.

DETAILED DESCRIPTION

Figure 1:
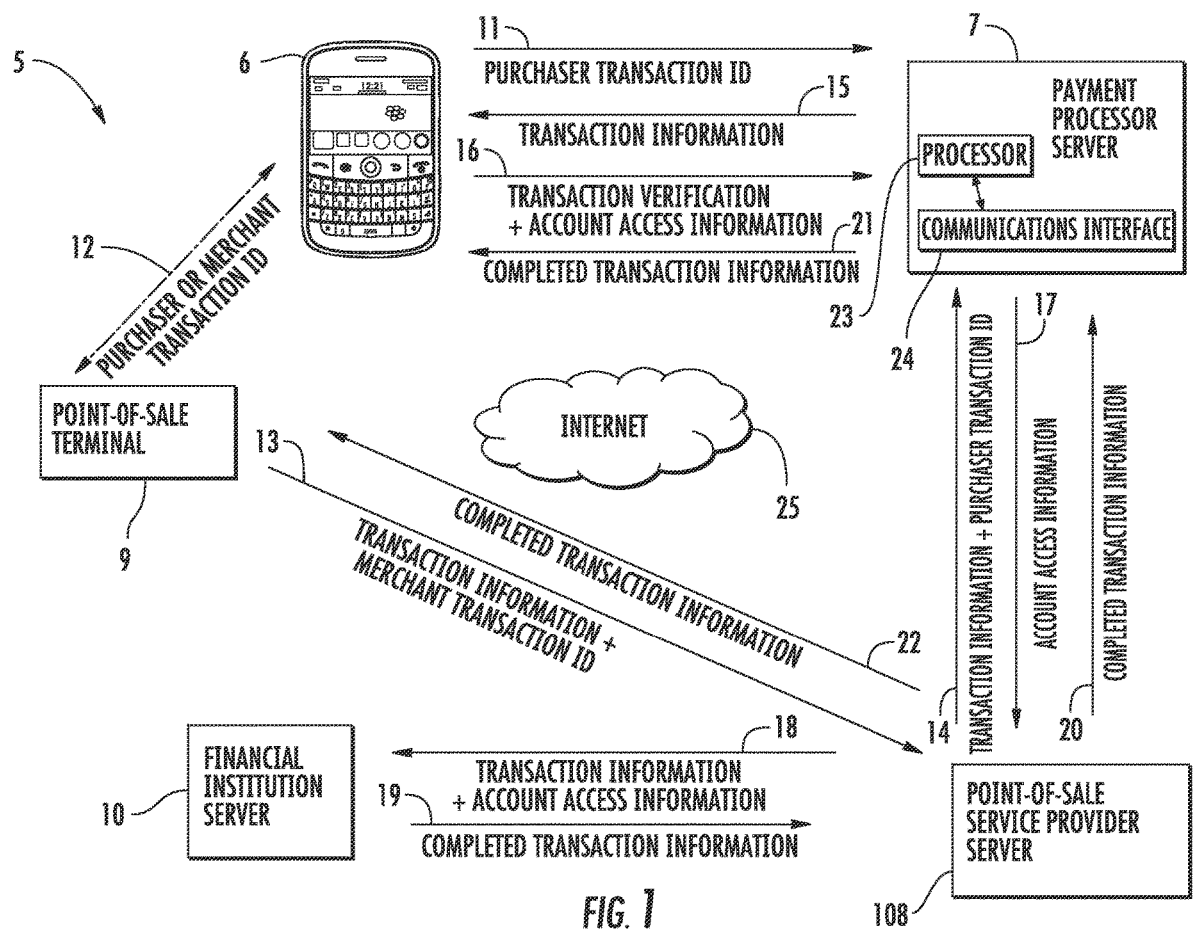
FIG. 1 is a schematic block diagram of an electronic payment system according to the present disclosure.

The present description is made with reference to the accompanying drawings, in which various embodiments are shown. However, many different embodiments may be used, and thus the description should not be construed as limited to the embodiments set forth herein. Rather, these embodiments are provided so that this disclosure will be thorough and complete. Like numbers refer to like elements throughout.

Generally speaking, an electronic payment system is for a merchant server to transfer funds from a purchaser account to a merchant account. The merchant server may be configured to send a merchant transaction identification (ID) and transaction information. In addition, the electronic payment system may comprise a mobile wireless communications device configured to send a purchaser transaction ID and purchaser account access information.

A payment processor server may be configured to receive the purchaser transaction ID and purchaser account access information, and may further be configured to send the transaction information to the mobile wireless communications device if the merchant transaction ID matches the purchaser transaction ID.

The mobile wireless communications device may also be configured to send confirmation of the transaction information to the payment processor server. Further, the payment processor server may also configured to effect a transfer of funds from the purchaser account to the merchant account based upon the confirmation of the transaction information and the purchaser account access information.

The merchant server may be configured to send the merchant transaction ID and transaction information to a payment gateway and the payment processor server may be configured to receive the merchant transaction ID and transaction information via the payment gateway. The payment processor server may be configured to effect the transfer of funds by sending the transaction information and the purchaser account access information to a payment gateway.

The payment processor server may also be configured to send completed transaction information, based upon the transfer of funds, to the merchant server and the mobile wireless communications device. In addition, the transaction information may comprise a merchant identifier and a transaction amount.

The at least one mobile wireless communications device may comprise a display configured to display the transaction amount and at least one input device configured to alter the transaction amount. The purchaser account may comprise a plurality of user accounts and the mobile wireless communications device may comprise a display configured to display the plurality of user accounts, and at least one input device configured to select the purchaser account from among the plurality of user accounts.

The purchaser account may comprise at least one of a gift card account, a credit card account, a loyalty account, and a bank account. The mobile wireless communications device and the merchant server may communicate with the payment processor server via an encrypted Internet connection.

A method aspect is directed to a method of operating a payment processing server to transfer funds from a purchaser account to a merchant account. The method may include receiving a purchaser transaction identification (ID) and purchaser account access information from a mobile wireless communications device, and receiving a merchant transaction ID and transaction information from a merchant server. The transaction information may be sent to the mobile wireless communications device if the merchant transaction ID matches the purchaser transaction ID.

Confirmation of the transaction information may be received from the mobile wireless communications device and a transfer of funds may be effected from the purchaser account to the merchant account based upon the confirmation of the transaction information and the purchaser account access information.

With reference to FIG. 1, an electronic payment system 5 is now described. The electronic payment system 5 includes a mobile wireless communications device 6 operating over a wireless network (not shown), a payment processor server 7, a point-of-sale (POS) service provider server 8, and a point-of-sale (POS) device 9.

The mobile wireless communications device 6 may be any device capable of wireless communication, such as cellular phone, a smartphone, a media player, a netbook, a laptop, or a personal digital assistant (PDA). In addition, the wireless network may comprise a cellular network and may employ at least one cellular protocol, such as Global System for Mobile Communications (GSM) or Code Division Multiple Access (CDMA). The wireless network may additionally or alternatively comprise a wireless data network employing a wireless protocol, such as Wi-Fi or WiMAX. Whether cellular or data based, the wireless network provides connectivity with a WAN, such as the Internet.

The POS device 9 is illustrated as a POS terminal, but may be other devices, as will be appreciated by those skilled in the art (and explained in further detail below). The POS device 9 may be a POS terminal as known to those of skill in the art, for example of the type manufactured and sold by Global Payments Inc. (Atlanta, Ga.). Indeed, the use of existing POS terminals 9 may be advantageous in certain embodiments, as purchase of new hardware to equip stores to use the electronic payment system 5 may not be necessary. Rather, new computer executable modules loaded into a memory of the POS terminal 9 to be executed by a processor thereof may upgrade the POS terminal to work with the electronic payment system 5.

The financial institution server 10 is a server maintained by a financial institution, such as a clearinghouse, a bank, or credit card processor, and is for transferring money between various accounts. For example, the financial institution server 10 may transfer funds from a user account to a merchant account. The POS service provider server 8 acts as an intermediary between the POS terminal 9 and the financial institution server 10.

The payment processor server 7 may be a computer, illustratively including a processor 23 and a communications interface 24 cooperating therewith. The processor 23 and communications interface 24 cooperate and are configured to perform the functions that will be described in detail below.

The mobile wireless communications device 6 may communicate with the payment processor server 7 via a WAN, such as the Internet 25. This WAN connection may be encrypted on unencrypted, and may be a Virtual Private Network (VPN), for example. The payment processor server 7 may communicate with the POS service provider server 8 via an encrypted or unencrypted WAN as well. The POS terminal 9 may communicate with the POS service provider server 8 via an encrypted or unencrypted WAN. The POS service provider server 8 may also communicate with the POS terminal 9 via a WAN.

It should also be understood that the mobile wireless communications device 6, payment processor server 7, POS terminal 9, POS provider server 8, and financial institution server 10 may each encrypt some, or all of, the data they communicate to each other. This provides additional security and helps keep user information secret.

Figure 4:
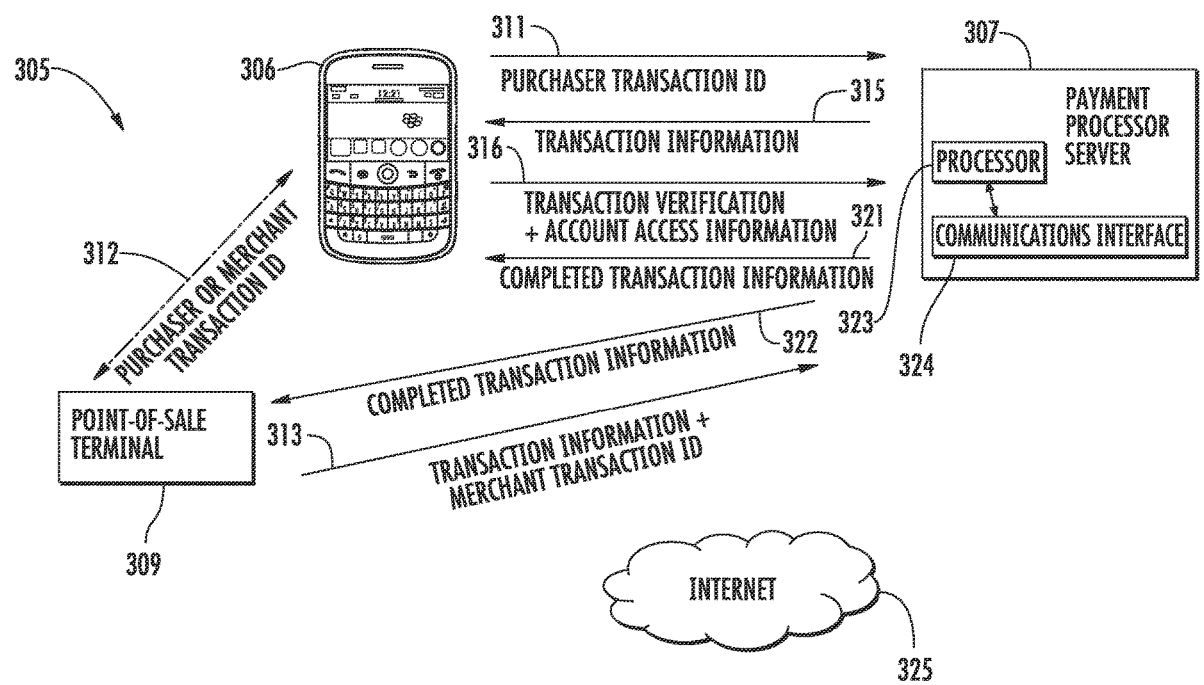
FIG. 4 is a schematic block diagram of a further embodiment of an electronic payment system, according to the present disclosure.

Although the payment processor server 7 and the POS provider 8 are illustrated as separate servers, those of skill in the art will appreciate that in an alternative implementation, the functionalities of both may be combined in one server (as depicted in FIG. 4), reducing the number of communications sent and received during the operation of the payment processor system 5, and also time required to complete them.

The electronic payment system 5 may be activated by a user of either the mobile wireless communications device 6 or the POS terminal 9. If a user of the mobile wireless communications device 6 activates the electronic payment system 5, an electronic payment function of the mobile wireless communications device is initiated. After activation of the electronic payment function, the mobile wireless communications device 6 autonomously generates (shown by arrow 11) a unique purchaser transaction identification (purchaser transaction ID) and communicates it via the wireless network to the associated payment processor server 7.

The purchaser transaction ID is an identification number used assigned to a specific transaction between the user and the merchant. In order to enhance the uniqueness of this ID, a combination of the unique device ID and a randomly generated number may be used. The purchaser transaction ID may include numbers, letters, and combinations thereof. In addition, the purchaser transaction ID may include symbols or be represented as a barcode (e.g. a 2-D barcode) to be read by a bar code reader at the POS device 9.

Alternatively (not shown in the diagram of the payment processor system 5) the payment processor server 7 may assign the unique purchaser transaction ID to the mobile wireless communication device 6 based on a request communicated by or on behalf of the mobile wireless communication device. Geographic categorization codes, which are based on location information generated by the mobile wireless communications device 6, may also be included in the purchaser transaction ID to reduce the number of the symbols to save bandwidth.

To increase system security, this unique purchaser transaction ID may have a life-time that is adjusted by payment system 5 (e.g. the purchaser transaction ID may expire in 10 minutes) and may also become void once used. The mobile wireless communications device 6 may additionally send a device ID (not shown) to the payment processor server 7 that the payment processor server may use to recognize the mobile wireless communications device. The payment processor server 7 does not send the device ID to the POS terminal 9, thereby shielding the device ID and preserving the privacy of the mobile wireless communications device 6 from the merchant and POS service provider server 8.

This unique purchaser transaction ID is then communicated (shown by arrow 12) to the POS terminal 9. This communication may be via a wired or wireless connection.

Alternatively, the purchaser transaction ID may be manually entered into the POS terminal 9 via a keypad or using another input device of the POS terminal 9 such as a barcode reader (not shown), in the case where a barcode representation of the purchaser transaction ID is displayed on the display of the mobile wireless communications device 6.

The POS terminal 9 may be a POS terminal as known to those of skill in the art, for example of the type manufactured and sold by Global Payments Inc. (Atlanta, Ga.). Indeed, the use of existing POS terminals 9 may be advantageous in certain embodiments, as purchase of new hardware to equip stores to use the electronic payment system 5 may not be necessary. Rather, new computer executable modules loaded into a memory of the POS terminal 9 to be executed by a processor thereof may upgrade the POS terminal to work with the electronic payment system 5. This upgrade may be also performed remotely via a wired or wireless connection to the POS Service Provider 8.

The POS terminal 9 then sends (shown by arrow 13) a merchant transaction ID (originally generated by the mobile wireless communications device 6 as the purchaser transaction ID and then communicated to the POS terminal 9) together with transaction information to the POS Service Provider Server 8 where it is forwarded to the payment processor server 7 (shown by arrow 14). The transaction information may include the amount of the bill, the time, the store's name and location, and the merchant's ID in the POS system, for example.

If the payment processor server 7 has received a purchaser transaction ID and a merchant transaction ID that match, the electronic payment process will continue. Otherwise, the payment processor server 7 sends a transaction failure message (not shown) to the mobile wireless communications device 6 directly, and to the POS terminal 9 via the POS service provider server 8.

After receiving a matching purchaser transaction ID and merchant transaction ID, and receiving the transaction information from the POS terminal 9, the payment processor server 7 sends (shown by arrow 15) the transaction information to the mobile wireless communications device 6 over the wireless network. The mobile wireless communications device 6 displays the transaction information and requests verification of the transaction via an input device, if requested by financial institution regulations.

Modification of the transaction amount may be possible at this time. For example, the mobile wireless communications device 6 may display "Joe's Restaurant—$50." A tip may then be added, bringing the total to $57.50 for example, and the transaction may be verified.

At this point, the mobile wireless communications device 6 may display the purchaser account information to the user (buyer). When the transaction is verified and a payment account is selected, the mobile wireless communications device 6 sends (shown by arrow 16) a transaction verification and account access information for a purchaser account to the payment processor server 7 over the wireless network.

The access information may include information to enable access to one or more accounts from which to pay the merchant. Such accounts may comprise bank accounts, credit card accounts, or even gift card accounts. Payment may be selected from one account or a combination of accounts from a list of accounts on the mobile wireless communications device 6. In this case, a desired amount can be selected from each account to total the total purchase price. Also, gift cards or electronic coupons from a list on the mobile wireless communications device 6 may be used.

If a selected account is a checking account that may be accessed via a debit card, the mobile wireless communications device 6 may prompt the user to enter the pin number that corresponds to the debit account, and the account access information may then include the pin number. If multiple accounts are selected, account access information from each account may be sent by the mobile wireless communications device 6 to the payment processor server 7 in one transmission.

The payment processor server 7 then sends (shown by arrow 17) the account access information (for one or more accounts) to the POS service provider server 8. The transaction information and access information are next sent (shown by arrow 18) to the appropriate financial institution server 10 by the POS provider 7. In the case that payment is to be from multiple user accounts, the POS server 7 may send multiple transmissions containing transaction information and account access information to different financial institutions to validate a payment made from multiple user accounts.

The financial institution server 10 effectuates the transfer of funds from the user account(s) to the merchant's account. When the transfer is complete, the financial institution server 10 sends (shown by arrow 19) completed transaction information to the POS provider 7. The completed transaction information may include not only a message indicating that the transfer was successful, but also an authorization number, time and date stamp, and other relevant information. Next, the POS service provider server 8 communicates (shown by arrows 20, 22) the completed transaction information to both the POS terminal 9 and the payment processor server 7, which in turn communicates (shown by arrow 21) the completed transaction information to the mobile wireless communications device 6. At this point, the POSe terminal 9 may print a paper receipt to present to the user (buyer). Also, the mobile wireless communications device 6 may record a payment log for user records or to be used later by financial software.

If a problem is encountered during processing of the transaction, the financial institution server 10 may send an error message to the payment processor server 7 via the POS service provider server 8. Error messages may be sent to merchant or user (buyer) accordingly.

Those of skill in the art will recognize that the electronic payment system 5 may instead be initiated by a merchant. In such a case, an electronic payment function is initiated on the POS terminal 9. The POS terminal 9 then generates a unique merchant transaction ID and sends (shown by arrow 13) it to the POS service provider server 8, and then to the payment processor server 7 (shown by arrow 14) together with the transaction information. The merchant transaction ID is then communicated (shown by arrow 12) from the POS terminal 9 to the mobile wireless communications device 6. This communication may be via a wired or wireless connection. Alternatively, the merchant transaction ID may be manually entered into the mobile wireless communications device 6. The mobile wireless communications device 6 sends a purchaser transaction ID based upon the merchant transaction ID to the payment processor server 7 (shown by arrow 11). The remainder of the transaction proceeds the same as with a customer initiated payment, explained above.

The mobile wireless communications device 6 may store customer reward card information and may modify that customer reward card information based upon the transaction information. For example, the customer reward card information may include reward points earned for each dollar spent at a certain merchant. If the mobile wireless communications device 6 is used to pay at the corresponding merchant, a number of reward points that correspond to the amount spent (in the transaction information) may be added to the customer reward card information after receipt of the completed transaction information from the financial institution server 10.

Figure 9:
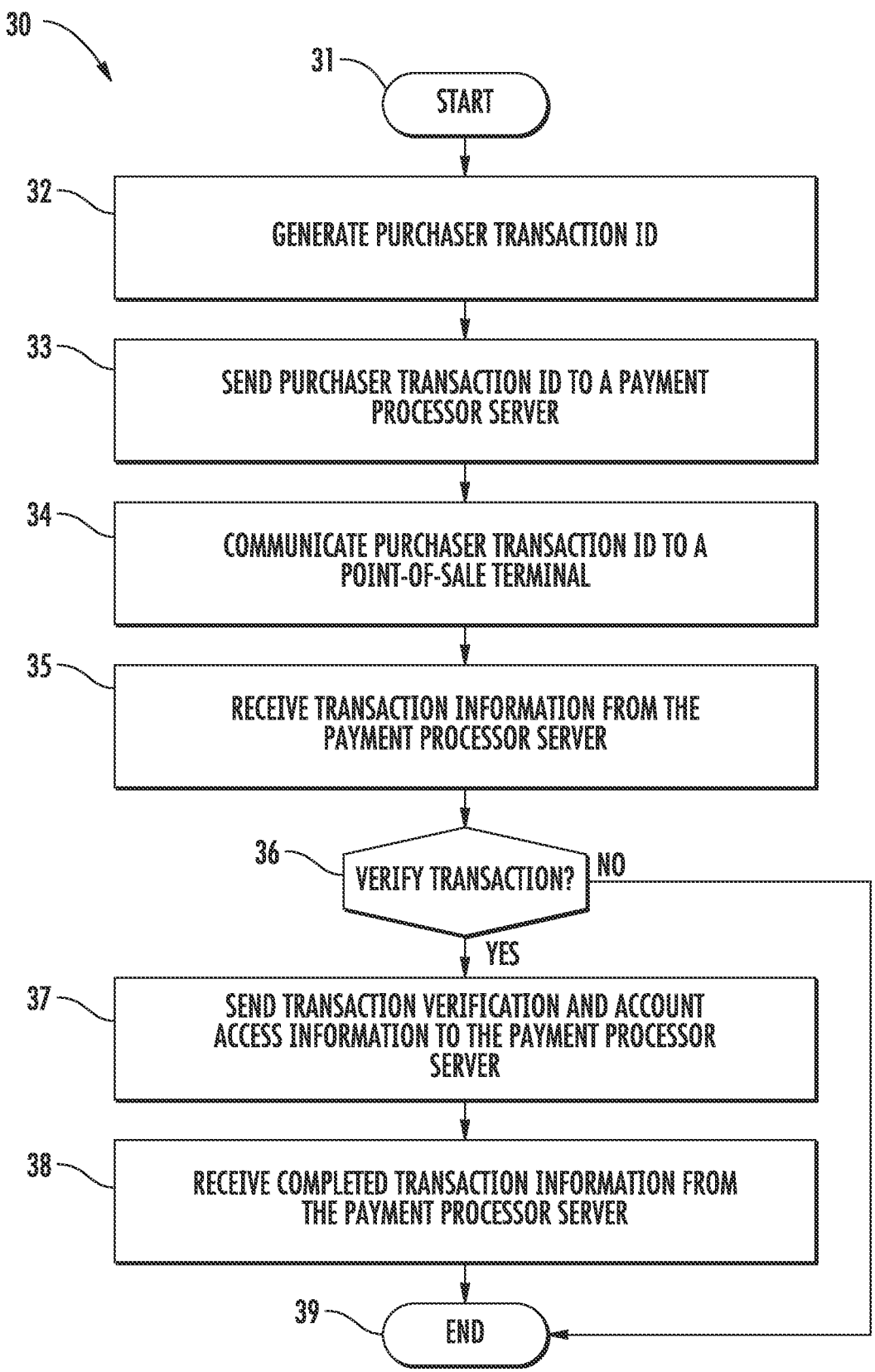
FIG. 9 is a flowchart of a method of operating the mobile wireless communications device of FIG. 1.

With reference to the flowchart 30 of FIG. 9, a method of operating the mobile wireless communications device is now described. After the start (Block 31), a purchaser transaction ID is generated (Block 32). Next, purchaser transaction ID is sent to the payment processor server (Block 33). Then, the purchaser transaction ID is communicated to the POS terminal (Block 34). Transaction information is then received from the payment processor server (Block 35).

If the transaction is verified via user input (Block 36), transaction verification information and account access information is sent to the payment processor server (Block 37). If the transaction is not verified, the method ends (Block 39). One the transaction is effectuated, completed transaction information is received from the payment processor server (Block 38). Block 39 indicates the end of the method.

Figure 10:
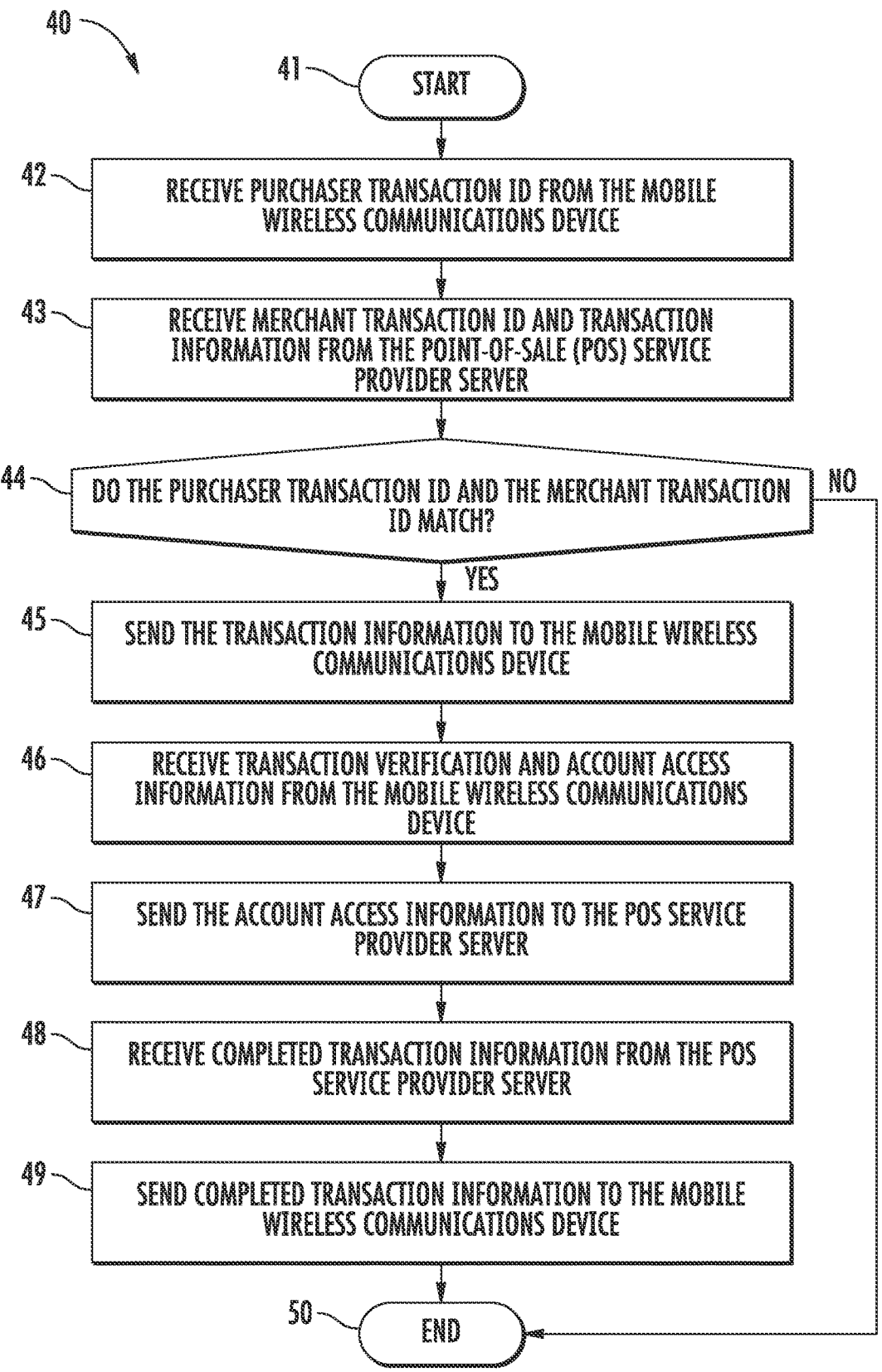
FIG. 10 is a flowchart of a method of operating the payment processor server of FIG. 1.

With reference to the flowchart 40 of FIG. 10, a method of operating the payment processor server is now described. After the start (Block 41), the purchaser transaction ID is received from the mobile wireless communications device (Block 42). Next, the merchant transaction ID and transaction is received from the POS service provider server (Block 43). At Block 44, if the purchaser transaction ID and the merchant transaction ID match, the transaction information is sent to the mobile wireless communications device (Block 45), and if the purchaser transaction ID and the merchant transaction ID do not match, the method ends (Block 50).

A transaction verification and account access information is received from the mobile wireless communications device (Block 46). The account access information is then sent to the POS service provider server (Block 47). After the transaction is effectuated, completed transaction information is received from the POS service provider server (Block 48). The completed transaction information is then sent to the mobile wireless communications device (Block 49). Block 50 indicates the end of the method.

Figure 2:
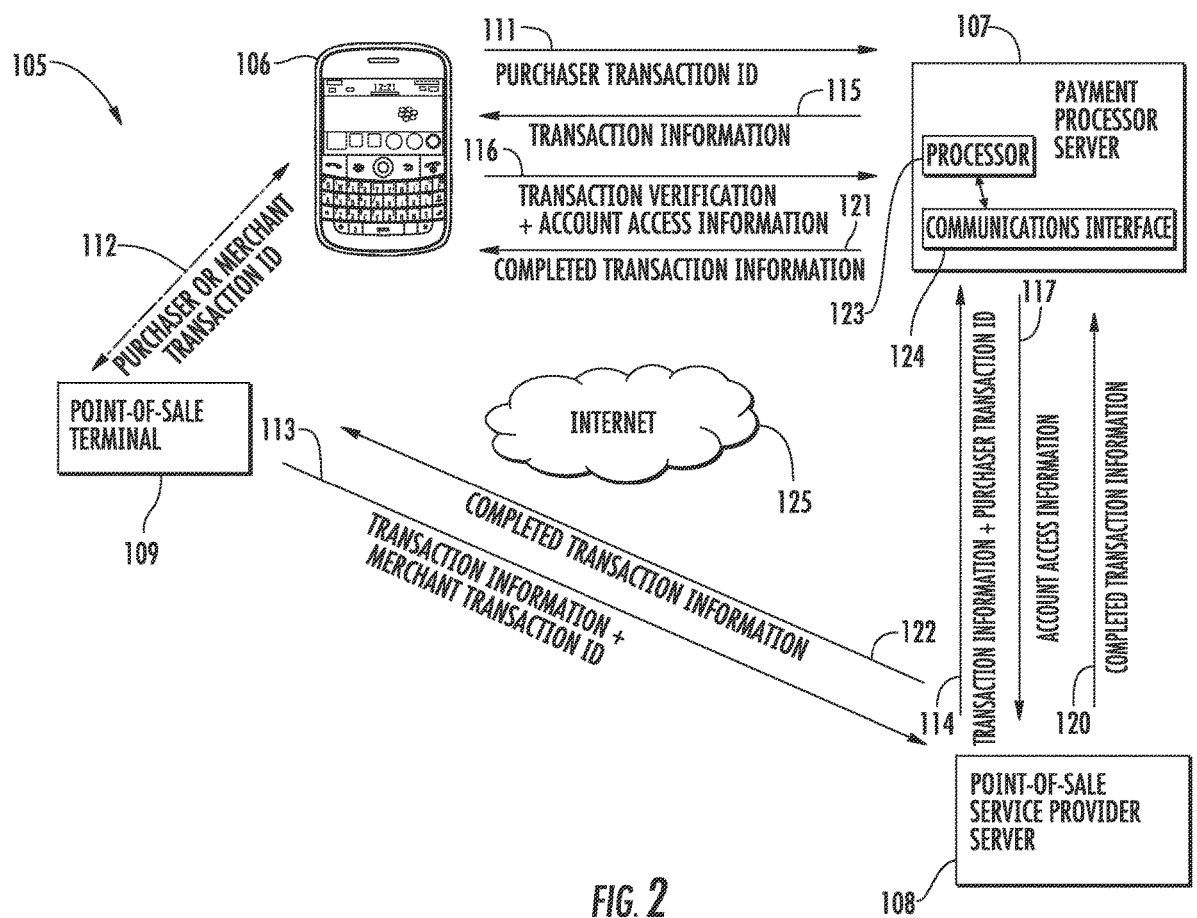
FIG. 2 is a schematic block diagram of an alternate embodiment of an electronic payment system according to the present disclosure.

As explained above, in some applications, the user account may be a gift card account, a retailer owned credit card account, a prepaid accounts, a buyer may use an electronic coupon, or a loyalty cards may be involved either for earning or redeeming points. An embodiment addressing such a situation is now described with reference to FIG. 2.

Here, the payment processor system 105 lacks a financial institution server. Instead, the functionalities previously provided by a financial institution server are now provided by the POS service provider server 108. That is, the POS service provider 108 now stores the account information, transfers the funds from the user account to the merchant account, and generates completed transaction information to be sent to the payment processor server.

As an example, here, the POS service provider server 108 has gift card user account information stored thereon. After receiving (shown by arrow 117) the transaction information and access information, the POS service provider server 108 transfers funds from the gift card account to the merchant's account, and sends (shown by arrow 120) completed transaction information to the payment processor server 107, where it is forwarded to the mobile wireless communications device 106, which may keep a local record of gift card remaining value. This gift card system provides an easy way to add to (top-up) a gift card value via the payment processing system 105.

In some applications, the gift card user account information is additionally or alternatively stored on the mobile wireless communications device 106. In this case, the POS service provider server 108 still effectuates the transfer of funds from the gift card account to the merchant's account, but does so by sending instructions to the mobile wireless communications device 106 through the payment processor server 107.

Those other elements not specifically mentioned are similar to the elements described above with reference to FIG. 1. Accordingly, those other elements require no further description herein.

Figure 3:
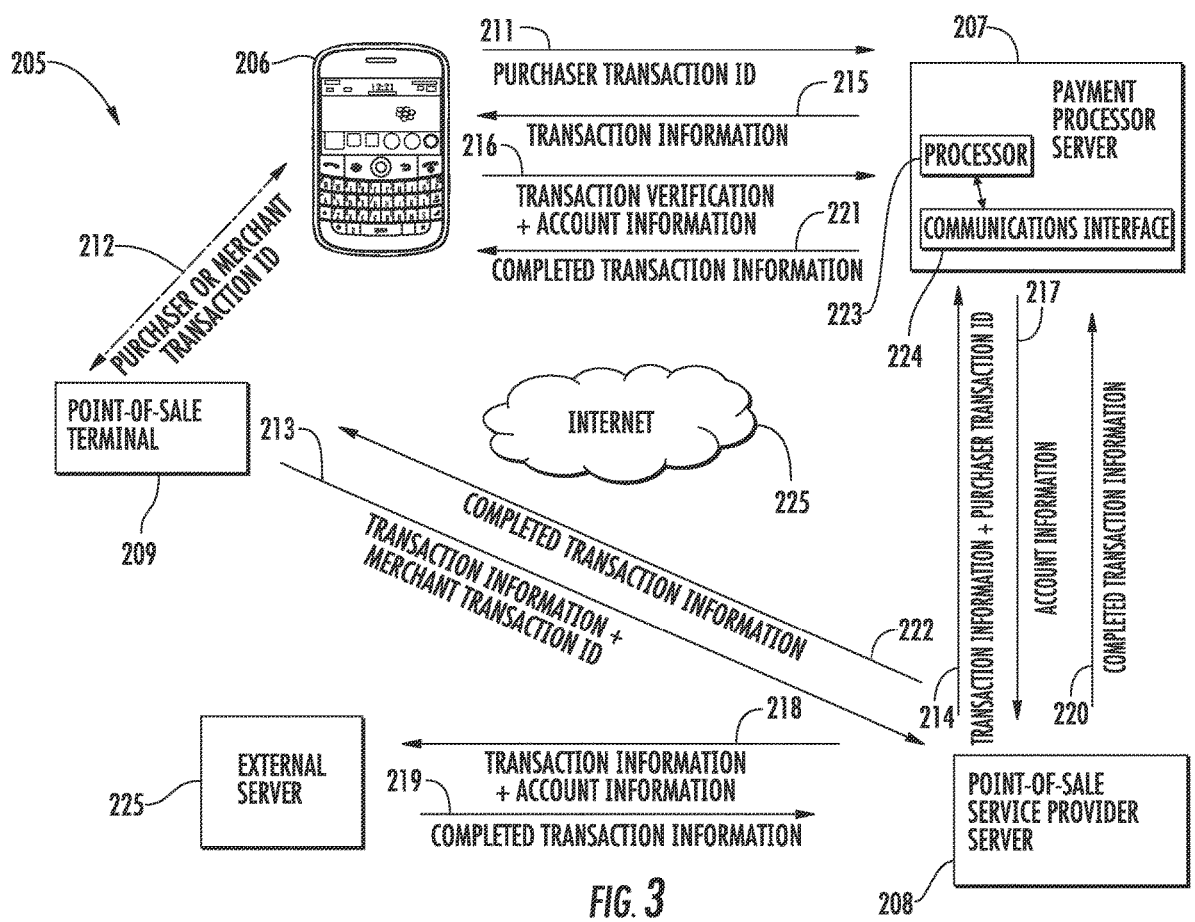
FIG. 3 is a schematic block diagram of a further embodiment of an electronic payment system including an external server, according to the present disclosure.

Making reference now to FIG. 3, a further embodiment of a payment processor server 205 for use when the user account comprises a gift card account, a retailer owned credit card account, a prepaid accounts, an electronic coupon, or a loyalty card is now described. Here, an external server 225 takes the role of the financial institution server. The external server 225 stores the account information, transfers the funds from the user account to the merchant account, and generates completed transaction information to be sent to the payment processor server 207.

Those other elements not specifically mentioned are similar to the elements described above with reference to FIG. 1. Accordingly, those other elements require no further description herein.

Referring now to FIG. 4, yet another embodiment of the payment processor system 305 for use when the user account comprises a gift card account, a retailer owned credit card account, a prepaid accounts, an electronic coupon, or a loyalty card is now described. Here, the payment processor server 307 takes the role of the financial institution server and the POS service provider is not present. The payment processor server 307 stores the account information, transfers the funds from the user account to the merchant account, and generates completed transaction information to be sent to the payment processor server.

Those other elements not specifically mentioned are similar to the elements described above with reference to FIG. 1. Accordingly, those other elements require no further description herein.

Figure 5:
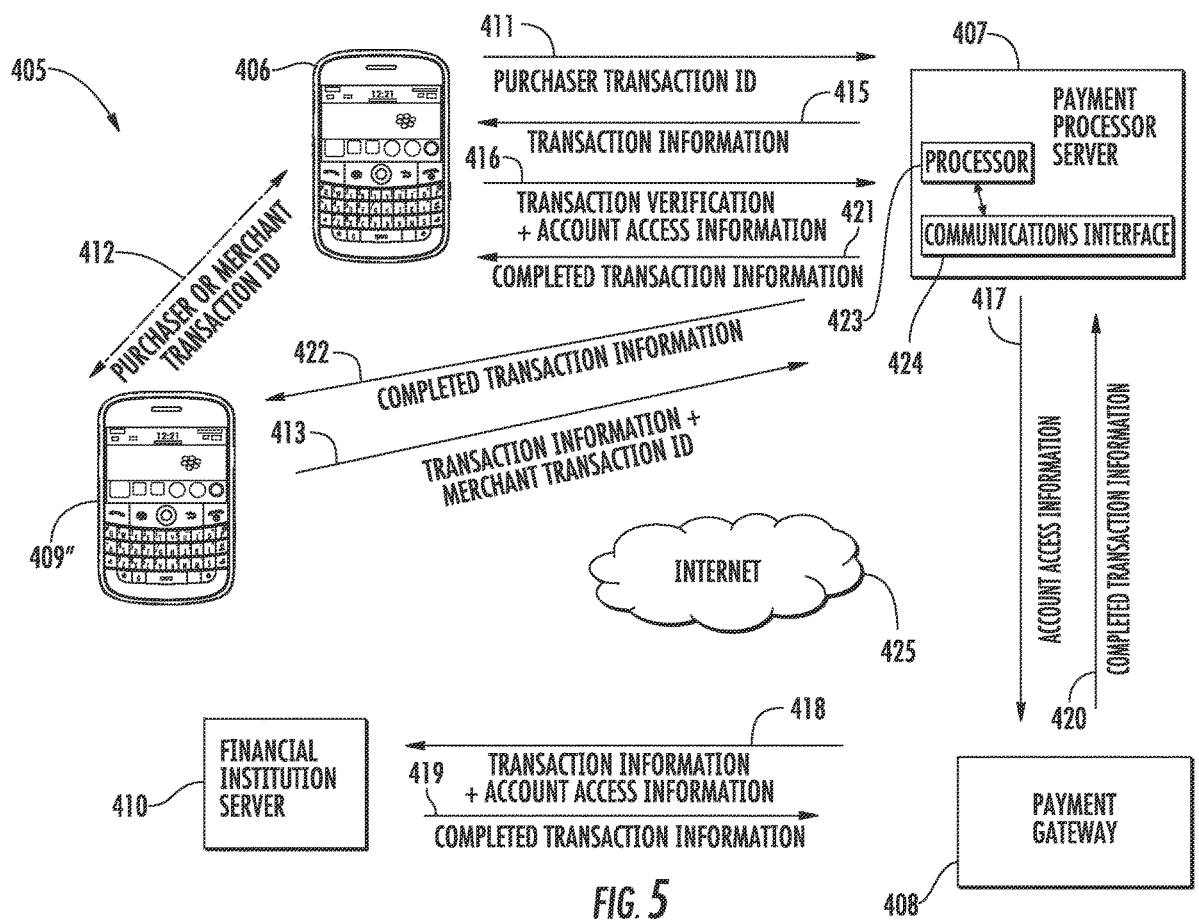
FIG. 5 is a schematic block diagram of an embodiment of an electronic payment system wherein the point-of-sale device is an other mobile wireless communications device, according to the present disclosure.

An embodiment wherein the POS device 409 comprises an other mobile wireless communications device is now described with reference to FIG. 5. Here, the other mobile wireless communications device 409 acts as any of the POS devices, and with any of the embodiments, as described above. This advantageously allows the payment processor system 405 to be used at any location and not merely at fixed POS terminals. For example, a deliveryman may use the payment processor system 405 including the other mobile wireless communications device 409 to accept payment from a customer at the customer's residence or place of business.

Such a payment processor system 405 may alleviate customer concern about communicating a credit card or account access number over a telephone, for example, when ordering delivery of a product (such as food), as an exchange of that credit card number or account access information between the customer and merchant may not take place. This payment processor system 405 may also be used by package deliverymen to accept a cash-on-delivery (COD) payment, for example, or by owners, employees, or agents of any business seeking a mobile payment processor solution.

Those other elements not specifically mentioned are similar to the elements described above with reference to FIGS. 1-4. Accordingly, those other elements require no further description herein.

Figure 6:
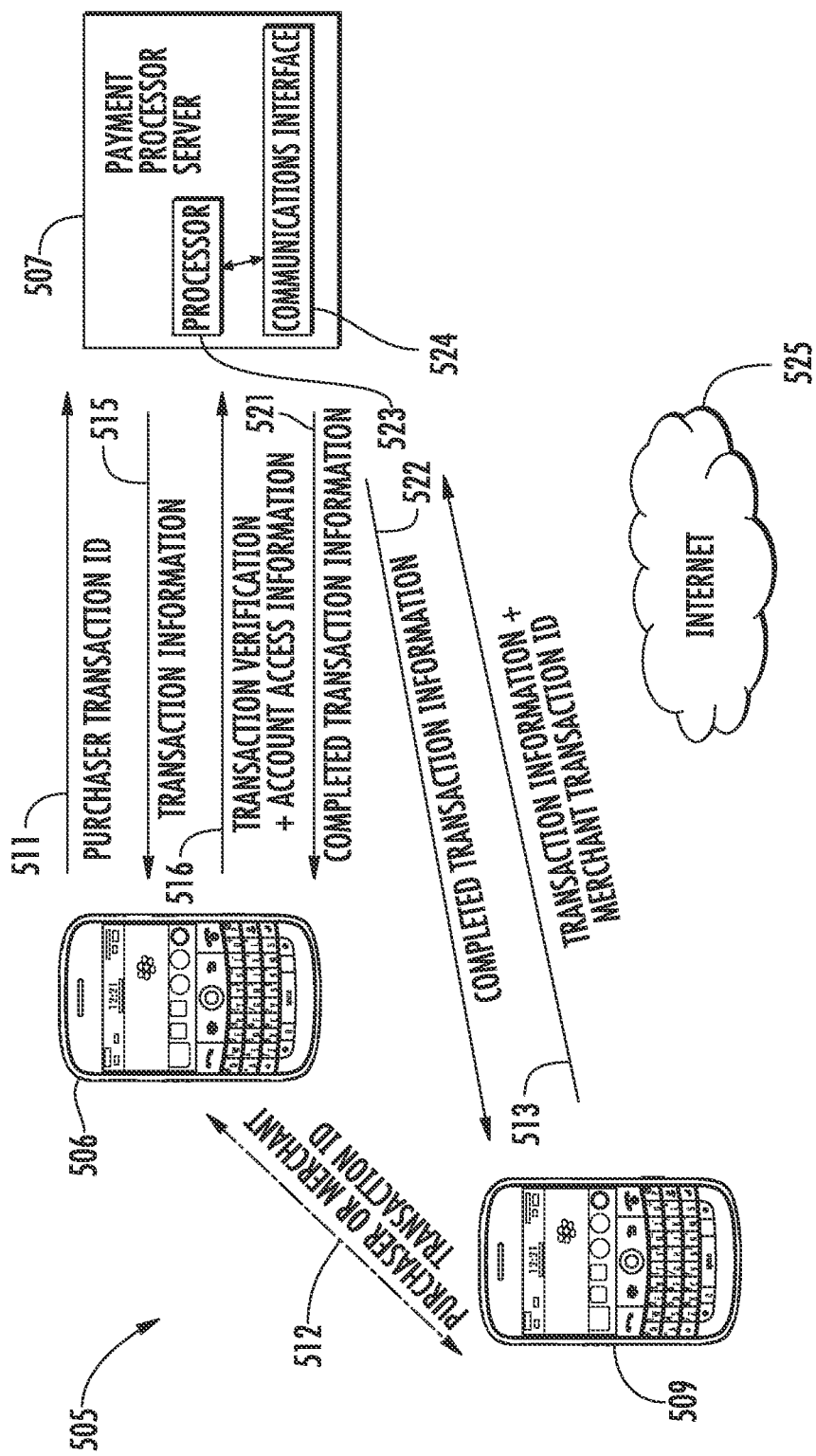
FIG. 6 is a schematic block diagram of a further embodiment of an electronic payment system wherein the point-of-sale device is an other, mobile wireless communications device, according to the present disclosure.

Referring now to FIG. 6, a further embodiment of the payment processor system 505 for use when the user account comprises a gift card account, a retailer owned credit card account, a prepaid accounts, an electronic coupon, or a loyalty card is now described. Here, the payment processor server 507 takes the role of the financial institution server and the POS service provider is not present. Further, the POS device comprises another mobile wireless communications device 509. The payment processor server 507 stores the account information, transfers the funds from the user account to the merchant account, and generates completed transaction information to be sent to the payment processor server.

Those other elements not specifically mentioned are similar to the elements described above with reference to FIG. 1-5. Accordingly, those other elements require no further description herein.

Figure 7:
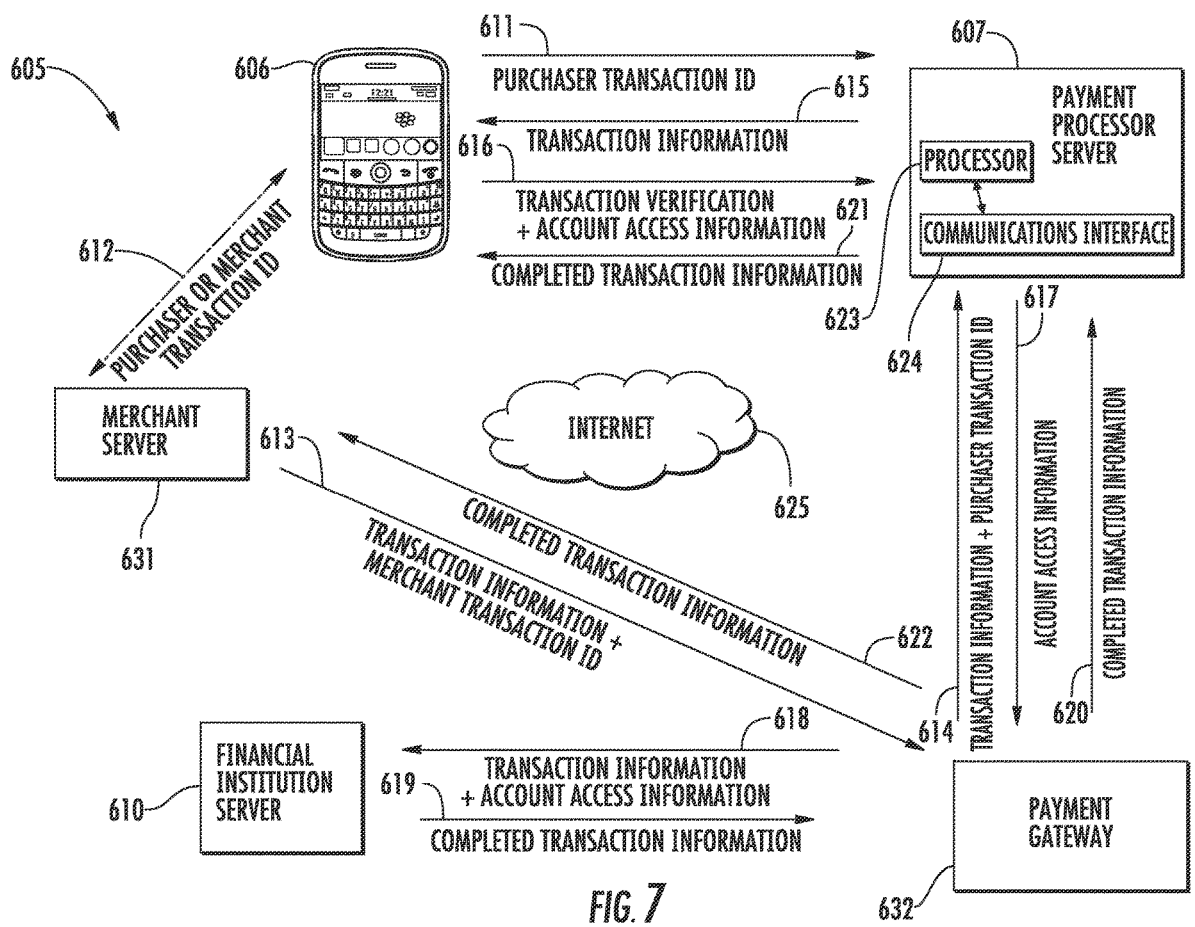
FIG. 7 a schematic block diagram of an embodiment of an electronic payment system including a merchant server, according to the present disclosure.

A further embodiment of the payment processor system 605 wherein a merchant server 631 performs the functions of the POS device (described above), and a payment gateway 632 performs the functions of the POS service provider, is now described with reference to FIG. 7. As stated, in this embodiment, a merchant server 631 takes the place of the POS device (i.e. it receives a purchaser transaction ID or generates a merchant transaction ID, sends transaction information and the purchaser/merchant transaction ID, and received completed transaction information). In addition to taking the place of the POS device, the merchant server 631 also accepts a user's order of goods and/or services placed using the mobile wireless communications device 606, for example via a web page. The merchant server 631 may host the web page, or it may communicate with a web server that hosts the web page.

Those skilled in the art will understand that the merchant server 631 may accept a user's order of goods and/or services in other suitable fashions as well. Further, it should be appreciated that, in the illustrated embodiment, the merchant server 631 and the mobile wireless communications device 606 may communicate the purchaser or merchant transaction ID to each other directly (shown by arrow 612), for example via the Internet 25. This payment processor system 605 advantageously allows a user to purchase goods/or service from the merchant server 631 without having to directly communicate his account information thereto, increasing security.

Those other elements not specifically mentioned are similar to the elements described above with reference to FIGS. 1-4. Accordingly, those other elements require no further description herein.

Figure 8:
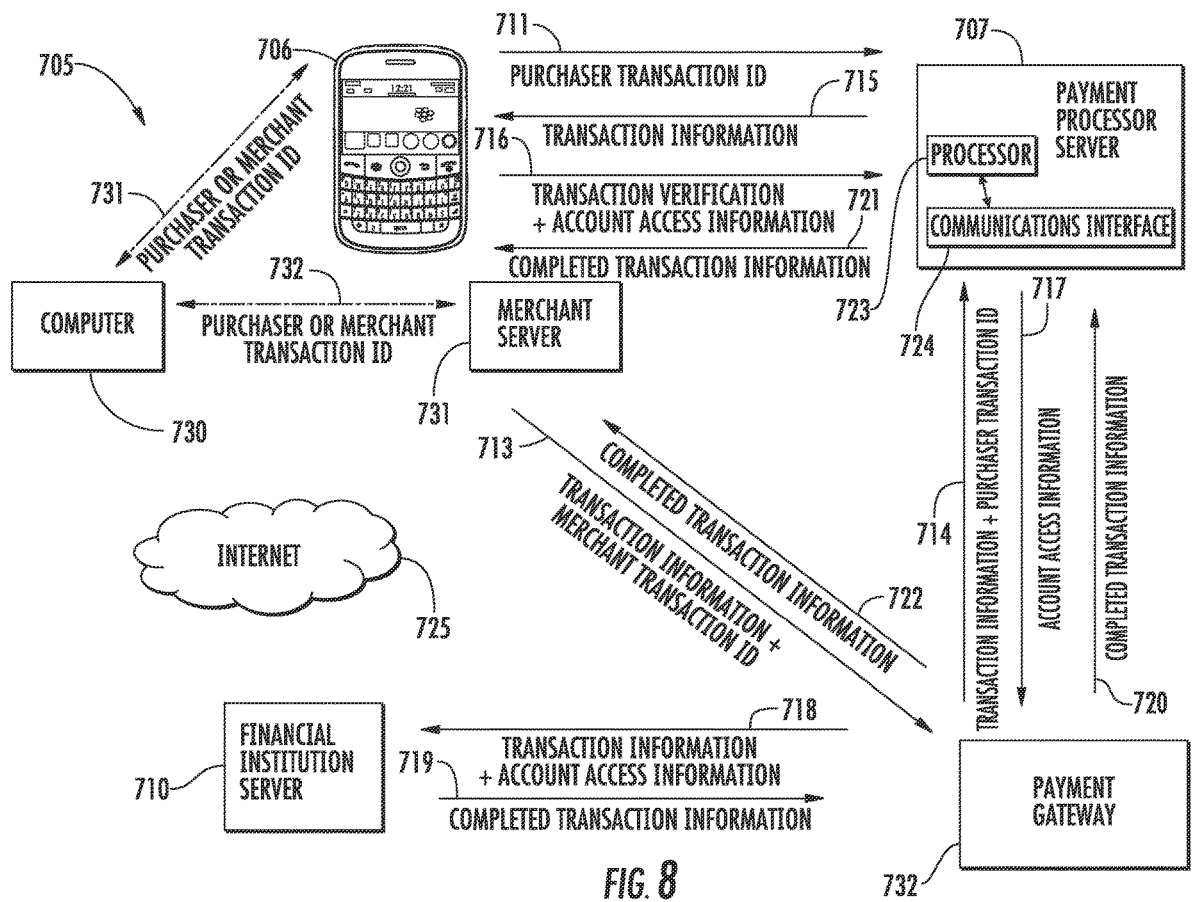
FIG. 8 is a schematic block diagram of an embodiment of an electronic payment system including a merchant server and a computer, according to the present disclosure.

In another similar embodiment of the payment processor system 705 shown in FIG. 8, the mobile wireless communications device 706 and the merchant server 731 may not directly communicate. Here, a computer 730 (such as a PC or laptop) communicates with the merchant server 731. A user places his order for goods and/or services from the merchant server 731 via the computer 730. When payment is to be made, the user may instruct the computer 730 to ask the merchant server 731 to generate a merchant transaction ID to thereby start the payment processing. In this case, the merchant server 731 communicates the merchant transaction ID to the computer 730 (shown by arrow 732). The user may then manually enter the merchant transaction ID into the mobile wireless communications device 706, and the payment processing may then proceed as described above.

Alternatively, the payment processor system 705 may be initiated on the mobile wireless communications device 706 and the purchaser transaction ID generated thereby may be sent to the merchant server 731 via the computer 730 (for example, the user may enter the purchaser transaction ID into the computer).

This payment processor system 705 advantageously provides a quick and secure way for online shopping to take place, since a user's account information may not be directly communicated to the merchant server 731. Those other elements not specifically mentioned are indicated with prime notation and are similar to the elements described above with reference to FIGS. 1-7. Accordingly, those other elements require no further description herein.

Exemplary components of a hand-held mobile wireless communications device 1000 that may be used in accordance with the electronic payment system 5 are further described in the example below with reference to FIG. 11. The device 1000 illustratively includes a housing 1200, a keypad 1400 and an output device 1600. The output device shown is a display 1600, which may comprise a full graphic LCD. In some embodiments, display 1600 may comprise a touch-sensitive input and output device. Other types of output devices may alternatively be utilized. A processing device 1800 is contained within the housing 1200 and is coupled between the keypad 1400 and the display 1600. The processing device 1800 controls the operation of the display 1600, as well as the overall operation of the mobile device 1000, in response to actuation of keys on the keypad 1400 by the user. In some embodiments, keypad 1400 may comprise a physical keypad or a virtual keypad (e.g., using a touch-sensitive interface) or both.

The housing 1200 may be elongated vertically, or may take on other sizes and shapes (including clamshell housing structures). The keypad 1400 may include a mode selection key, or other hardware or software for switching between text entry and telephony entry.

Figure 11:
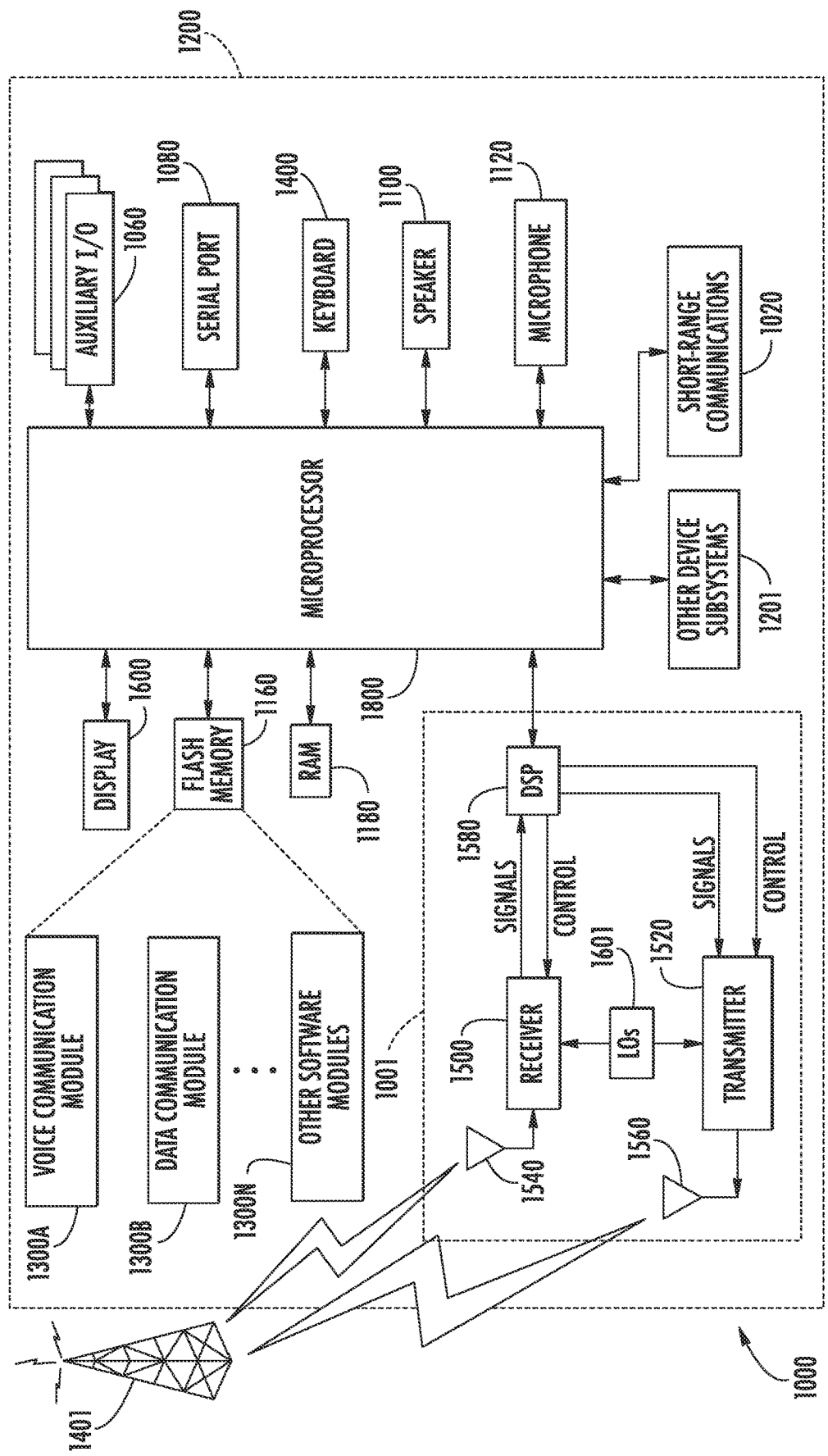
FIG. 11 is a schematic block diagram illustrating exemplary components of a mobile wireless communications device that may be used with the electronic payment system disclosed in FIGS. 1-10.

In addition to the processing device 1800, other parts of the mobile device 1000 are shown schematically in FIG. 11. These include a communications subsystem 1001; a short-range communications subsystem 1020; the keypad 1400 and the display 1600, along with other input/output devices 1060, 1080, 1100 and 1120; as well as memory devices 1160, 1180 and various other device subsystems 1201. The mobile device 1000 may comprise a two-way RF communications device having voice and data communications capabilities. In addition, the mobile device 1000 may have the capability to communicate with other computer systems via the Internet.

Operating system software executed by the processing device 1800 may be stored in a persistent store, such as the flash memory 1160, but may be stored in other types of memory devices, such as a read only memory (ROM) or similar storage element. In addition, system software, specific device applications, or parts thereof, may be temporarily loaded into a volatile store, such as the random access memory (RAM) 1180. Communications signals received by the mobile device may also be stored in the RAM 1180.

The processing device 1800, in addition to its operating system functions, enables execution of software applications 1300A-1300N on the device 1000. A predetermined set of applications that control basic device operations, such as data and voice communications 1300A and 1300B, may be installed on the device 1000 during manufacture. In addition, a personal information manager (PIM) application may be installed during manufacture. The PIM may be capable of organizing and managing data items, such as e-mail, calendar events, voice mails, appointments, and task items. The PIM application may also be capable of sending and receiving data items via a wireless network 1401. The PIM data items may be seamlessly integrated, synchronized and updated via the wireless network 1401 with the device user's corresponding data items stored or associated with a host computer system.

Communication functions, including data and voice communications, are performed through the communications subsystem 1001, and possibly through the short-range communications subsystem. The communications subsystem 1001 includes a receiver 1500, a transmitter 1520, and one or more antennas 1540 and 1560. In addition, the communications subsystem 1001 also includes a processing module, such as a digital signal processor (DSP) 1580, and local oscillators (LOs) 1601. The specific design and implementation of the communications subsystem 1001 is dependent upon the communications network in which the mobile device 1000 is intended to operate. For example, a mobile device 1000 may include a communications subsystem 1001 designed to operate with the Mobitex™, Data TAC™ or General Packet Radio Service (GPRS) mobile data communications networks, and also designed to operate with any of a variety of voice communications networks, such as AMPS, TDMA, CDMA, WCDMA, PCS, GSM, EDGE, etc. Other types of data and voice networks, both separate and integrated, may also be utilized with the mobile device 1000. The mobile device 1000 may also be compliant with other communications standards such as 3GSM, 3G, UMTS, 4G, etc.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore utilizes a subscriber identity module, commonly referred to as a SIM card, in order to operate on a GPRS network.

When required network registration or activation procedures have been completed, the mobile device 1000 may send and receive communications signals over the communication network 1401. Signals received from the communications network 1401 by the antenna 1540 are routed to the receiver 1500, which provides for signal amplification, frequency down conversion, filtering, channel selection, etc., and may also provide analog to digital conversion. Analog-to-digital conversion of the received signal allows the DSP 1580 to perform more complex communications functions, such as demodulation and decoding. In a similar manner, signals to be transmitted to the network 1401 are processed (e.g. modulated and encoded) by the DSP 1580 and are then provided to the transmitter 1520 for digital to analog conversion, frequency up conversion, filtering, amplification and transmission to the communication network 1401 (or networks) via the antenna 1560.

In addition to processing communications signals, the DSP 1580 provides for control of the receiver 1500 and the transmitter 1520. For example, gains applied to communications signals in the receiver 1500 and transmitter 1520 may be adaptively controlled through automatic gain control algorithms implemented in the DSP 1580.

In a data communications mode, a received signal, such as a text message or web page download, is processed by the communications subsystem 1001 and is input to the processing device 1800. The received signal is then further processed by the processing device 1800 for an output to the display 1600, or alternatively to some other auxiliary I/O device 1060. A device user may also compose data items, such as e-mail messages, using the keypad 1400 and/or some other auxiliary I/O device 1060, such as a touchpad, a rocker switch, a thumb-wheel, track ball, or some other type of input device. The composed data items may then be transmitted over the communications network 1401 via the communications subsystem 1001.

In a voice communications mode, overall operation of the device is substantially similar to the data communications mode, except that received signals are output to a speaker 1100, and signals for transmission are generated by a microphone 1120. Alternative voice or audio I/O subsystems, such as a voice message recording subsystem, may also be implemented on the device 1000. In addition, the display 1600 may also be utilized in voice communications mode, for example to display the identity of a calling party, the duration of a voice call, or other voice call related information.

The short-range communications subsystem enables communication between the mobile device 1000 and other proximate systems or devices, which need not necessarily be similar devices. For example, the short-range communications subsystem may include an infrared device and associated circuits and components, or a Bluetooth™ communications module to provide for communication with similarly-enabled systems and devices.

Many modifications and other embodiments of the disclosure will come to the mind of one skilled in the art having the benefit of the teachings presented in the foregoing descriptions and the associated drawings. Therefore, it is understood that this disclosure is not to be limited to the specific embodiments disclosed, and that modifications and embodiments are intended to be included within the scope of the appended claims.

That which is claimed is:

1. A communication system for supporting electronic payments for transactions, the communication system comprising:
   a mobile wireless communications device configured to:
      store information for a plurality of purchaser accounts for a single user of the mobile wireless communications device; and
      generate a transaction identification (ID) and send a first communication comprising a transaction ID to a payment processor server over a wireless network; and
      provide the transaction ID to a point of sale (POS) terminal; and
   the payment processor server, configured to:
      receive the first communication comprising the transaction ID from the mobile wireless communications device and a second communication comprising the transaction ID and transaction information sent by the POS terminal, wherein the transaction ID sent by the POS terminal is obtained by the POS terminal from the mobile wireless communications device;
      determine that the transaction ID received in the second communication matches the transaction ID received in the first communication;
      send the transaction information to said mobile wireless communications device after determining that the transaction ID received in the second communication matches the transaction ID received in the first communication;
   said mobile wireless communications device also configured to, after receiving the transaction information from the payment processor server:
      display the plurality of purchaser accounts stored at the mobile wireless communications device;

receive user input selecting at least two of the plurality of purchaser accounts and associated amounts for payment of a purchase amount from the display of the plurality of purchaser accounts, each selected purchaser account being associated with a different financial institution;

display a prompt for entry of account access information for at least one of the at least two selected purchaser accounts by the user;

receive user-entered account access information in response to the prompt; and send confirmation of the transaction information and access information for each of the at last two selected purchaser accounts, including the user-entered account access information, in a single transmission to said payment processor server;

said payment processor server also configured to effect a transfer of funds from the at least two selected purchaser accounts to a merchant account based upon the confirmation of the transaction information and the access information.

2. The communication system of claim 1 wherein the payment processor server receives the second communication from a payment gateway that receives the second communication from the merchant server.

3. The communication system of claim 1 wherein said payment processor server is also configured to send completed transaction information, based upon the transfer of funds, to the merchant server and said mobile wireless communications device.

4. The communication system of claim 1 wherein the transaction information comprises a merchant identifier and a transaction amount.

5. The communication system of claim 1 wherein said mobile wireless communications device and the merchant server communicate with said payment processor server via an encrypted Internet connection.

6. A communication system for supporting electronic payments for transactions, the communication system comprising:

a mobile wireless communications device configured to:
store information for a plurality of purchaser accounts for a single user of the mobile wireless communications device; and
generate a transaction identification (ID) and send a first communication comprising the transaction ID to a payment processor server;

a merchant server configured to receive an input transaction ID from the POS terminal and to send a second communication comprising transaction information and the input transaction ID to the payment processor server; and the payment processor server, configured to:
receive the first communication comprising the transaction ID from the mobile wireless communications device, and
receive the second communication comprising the transaction information and transaction ID from the merchant server;
after determining that the received transaction ID from the mobile wireless communications device matches the received transaction ID from the merchant server, send the transaction information to said mobile wireless communications device;

said mobile wireless communications device also being configured to, after receiving the transaction information from the payment processor server:
display the plurality of purchaser accounts stored at the mobile wireless communications device;
receive user input selecting at least two of the plurality of purchaser accounts and associated amounts for payment of a purchase amount from the display of the plurality of purchaser accounts, each selected purchaser account being associated with a different financial institution;
display a prompt for entry of account access information for at least one of the at least two selected purchaser accounts by the user;
receive user-entered account access information in response to the prompt; and
send confirmation of the transaction information and access information for each of the at last two selected purchaser accounts, including the user-entered account access information, in a single transmission to said payment processor server;

said payment processor server also being configured to effect a transfer of funds from the at least two selected purchaser accounts to a merchant account based upon the confirmation of the transaction information and the access information, to receive completed transaction information, and to send the completed transaction information to the mobile wireless communications device.

7. The communication system of claim 6 wherein the completed transaction information is received by each of the payment processor server and the merchant server from a payment gateway.

8. The communication system of claim 6 wherein said payment processor server is configured to effect the transfer of funds by sending the transaction information and the access information to a payment gateway.

9. The communication system of claim 8 wherein each of the payment processor server and the merchant server is also configured to receive the completed transaction information from the payment gateway.

10. The communication system of claim 1, wherein the transaction ID is input at the POS terminal from a display of the transaction ID on the mobile wireless communications device.

11. The communication system of claim 10, wherein the transaction ID is displayed on the mobile wireless communications device as a barcode to be read by an input device of the POS terminal.

12. The communication system of claim 6, wherein the input transaction ID is input at the POS terminal from a display of the transaction ID generated by the mobile wireless communications device.

13. The communication system of claim 12, wherein the transaction ID generated by the mobile wireless communications device is displayed as a barcode to be read by an input device of the POS terminal.

14. The communication system of claim 1, wherein the user-entered account access information comprises a personal identification number.

15. The communication system of claim 6, wherein the user-entered account access information comprises a personal identification number.

* * * * *